United States

Petrohilos

[11] 3,905,705

[45] *Sept. 16, 1975

[54] OPTICAL MEASURING APPARATUS

[75] Inventor: Harry G. Petrohilos, Yellow Springs, Ohio

[73] Assignee: Techmet Company, Dayton, Ohio

[ * ] Notice: The portion of the term of this patent subsequent to Oct. 16, 1990, has been disclaimed.

[22] Filed: Oct. 10, 1973

[21] Appl. No.: 404,929

Related U.S. Application Data

[63] Continuation-in-part of Ser. No. 222,032, Jan. 31, 1972, Pat. No. 3,765,774.

[52] U.S. Cl. .................................. 356/160; 350/7
[51] Int. Cl.² .................. G01B 11/04; G01B 11/10
[58] Field of Search ............ 350/6, 7; 356/156, 159, 356/160, 167; 128/2–6; 346/109

[56] References Cited
UNITED STATES PATENTS

| | | | |
|---|---|---|---|
| 3,443,110 | 5/1969 | Kelsall | 350/7 UX |
| 3,460,880 | 8/1969 | Henderson | 350/6 |
| 3,511,551 | 5/1970 | Matulka | 350/6 |
| 3,592,545 | 7/1971 | Paine et al. | 356/32 |
| 3,687,556 | 8/1972 | Price et al. | 350/7 X |
| 3,771,850 | 11/1973 | Casler | 350/6 |

FOREIGN PATENTS OR APPLICATIONS

| | | | |
|---|---|---|---|
| 384,874 | 2/1965 | Switzerland | 356/159 |
| 189,415 | 5/1964 | Sweden | 356/160 |

OTHER PUBLICATIONS

Leonard, "Digital Non Contact Gages..." Proc. 19th Int. ISA Iron and Steel Instrumentation Symposium, Pittsburgh, Pa., Mar. 1969, pp. 15–25.

*Primary Examiner*—Ronald L. Wibert
*Assistant Examiner*—Matthew W. Koren
*Attorney, Agent, or Firm*—Jacox & Meckstroth

[57] ABSTRACT

A narrow laser beam is directed towards a mirror which is rotated to effect rotary planar scanning or sweeping of a lens constructed to convert the rotary scanning beam into a parallel scanning beam. An article to be measured is positioned in the path of the parallel scanning beam at generally the focal point of the lens, and the interruptions of the parallel scanning beam, as produced by the article, are sensed by a photodetector. The photodetector transmits corresponding pulses or signals through an amplifier to an edge decoder which receives a reset signal with each pass of the scanning beam. The edge decoder may provide for selecting different combinations of signals received from the amplifier to control the counting of constant pulses received by a counter from a high frequency generator or clock so that the counted pulses correspond to the dimension of the article at the plane of the parallel scanning beam. Preferably, the motor which rotates the scanning mirror is supplied with electrical energy from the clock through a frequency divider, and the amplified signals from the photodetector are compared with a reference level to provide an automatic gain control for the amplifier.

4 Claims, 5 Drawing Figures

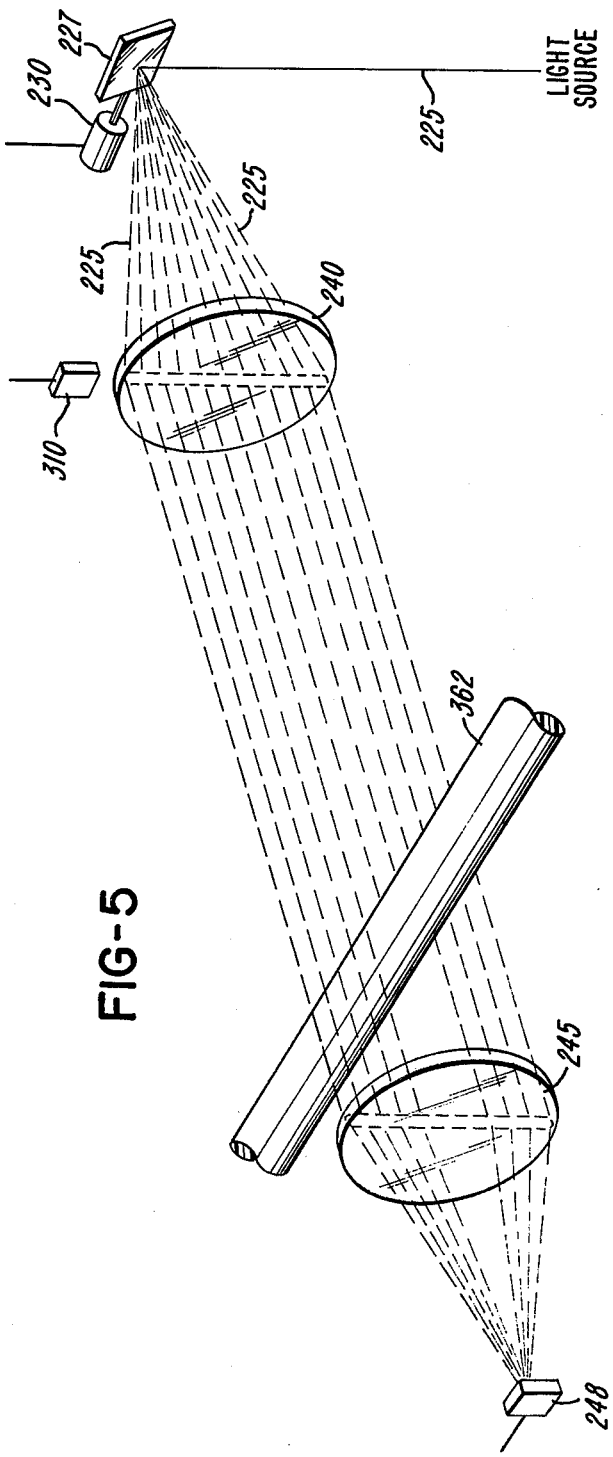

OPTICAL MEASURING APPARATUS

RELATED APPLICATION

This application is a continuation-in-part of Application Ser. No. 222,032, filed Jan. 31, 1972, now U.S. Pat. No. 3,765,774.

BACKGROUND OF THE INVENTION

There have been a number of devices constructed or proposed for optically measuring a dimension of an object or the distance between two objects, and which use a scanning light beam from a light source such as a laser. Some of the devices time the interruption of the scanning light beam as it is directed either across the object to be measured or across an opaque reference area within the space to be measured between the objects. For example, U.S. Pat. No. 3,533,701 disclosed an optical guage wherein a parallel scanning light beam is produced and reflected by a set of opposing reflecting elements mounted on either a corresponding set of endless belts or on the outer surfaces of corresponding cylinders driven in synchronism. U.S. Pat. No. 3,434,785 disclosed an optical distance meter wherein a constant width light beam is oscillated back and forth across an opaque object located between two articles spaced at a distance to be measured. It has also been proposed to bounce a laser beam off a revolving polygon against a mirror and then through a scanning lens and across a zone through which a bar or rod is passing. The beam is then directed through another lens and onto a silicon diode which produces signals corresponding to the diameter of the bar or rod.

It is desirable for such an optical measuring device to be of simplified, practical and economical construction and to provide for producing a precision readout within a tolerance of at least plus or minus 0.001 inch. It is also desirable for such a device to be durable in construction and to provide for selectively measuring both inside and outside dimensions of some objects or articles. Furthermore, it is highly desirable for the optical measuring device to compensate automatically for fluctuations in the power supply and to provide for dependable maintenance-free operation. As is apparent after carefully analyzing the optical measuring devices disclosed in the above patents, each of the devices is lacking in providing one or more of these desirable features.

SUMMARY OF THE INVENTION

The present invention is directed to an improved optical meansuring apparatus which provides all of the above desirable features and advantages and, in addition, may be conveniently adapted for optically determining the dimensions of a plurality of objects regardless of whether the objects are stationary or moving. The measuring apparatus of the invention also provides for convenient and rapid calibration after the apparatus is set up for use.

In accordance with one of the illustrated embodiments of the invention, of the optical measuring device generally includes a light source in the form of a laser which produces a narrow light beam having a diameter of approximately 1 millimeter. The light beam is converted into a rotary scanning light beam by a first surface mirror which is positioned within the path of the light beam at an angle of 45°. The mirror is mounted on a flywheel driven directly by a synchronous motor receiving a power supply from a high frequency pulse generator or clock through an adjustable frequency divider.

The rotary scanning light beam is directed through a scanner lens which converts the rotary scanning light beam to a parallel scanning light beam, and the article or object to be measured is located at approximately the focal point of the lens where the diameter of the light beam is minimized. The parallel scanning light beam is sensed by a photodetector which produces pulses or signals when the light reaching the photodetector changes in intensity. The signals are amplified and transmitted to a decoder which incorporates means for selecting different combinations of the signals according to the dimension to be measured.

The decoder transmits the selected signals to a gate which also receives the high frequency pulses from the clock, and the output of the gate is transmitted to a pulse counter calibrated so that each counted pulse represents a finite unit of length such as 0.0005 inch. The output of the pulse counter controls a digital readout display. Preferably, the amplifier is provided with a circuit which compares the signal output of the amplifier with a reference level and provides an automatic gain control to assure that each signal from the amplifier is held at the reference level.

Other features and advantages of the invention will be apparent from the following description, the accompanying drawing and the appended claims.

BRIEF DESCRIPTION OF THE DRAWINGS

FIG. 5 is a schematic perspective view illustrating a modification in a portion of the apparatus of FIG. 2.

DESCRIPTION OF THE PREFERRED EMBODIMENTS

Figure 1:
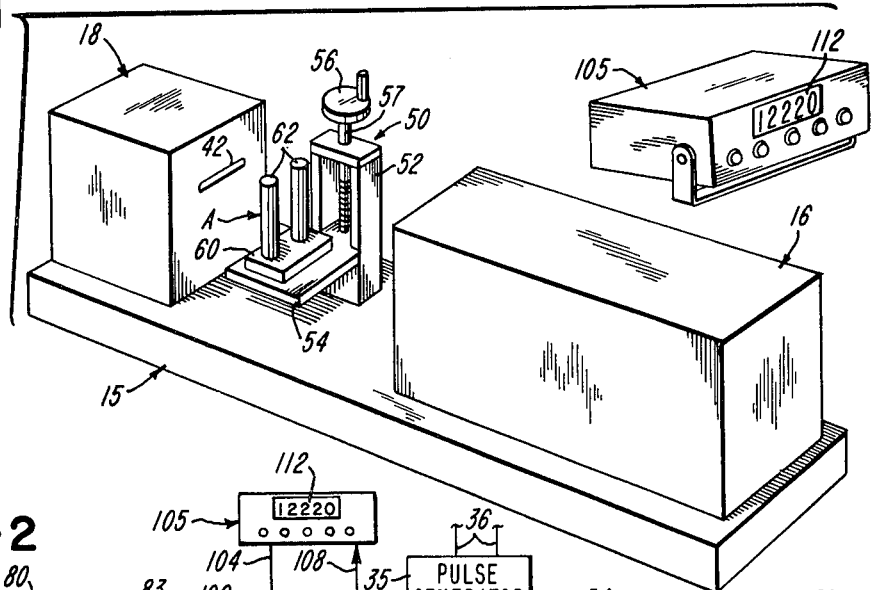
FIG. 1 is a perspective view of optical measuring apparatus constructed in accordance with the invention.
Figure 2:
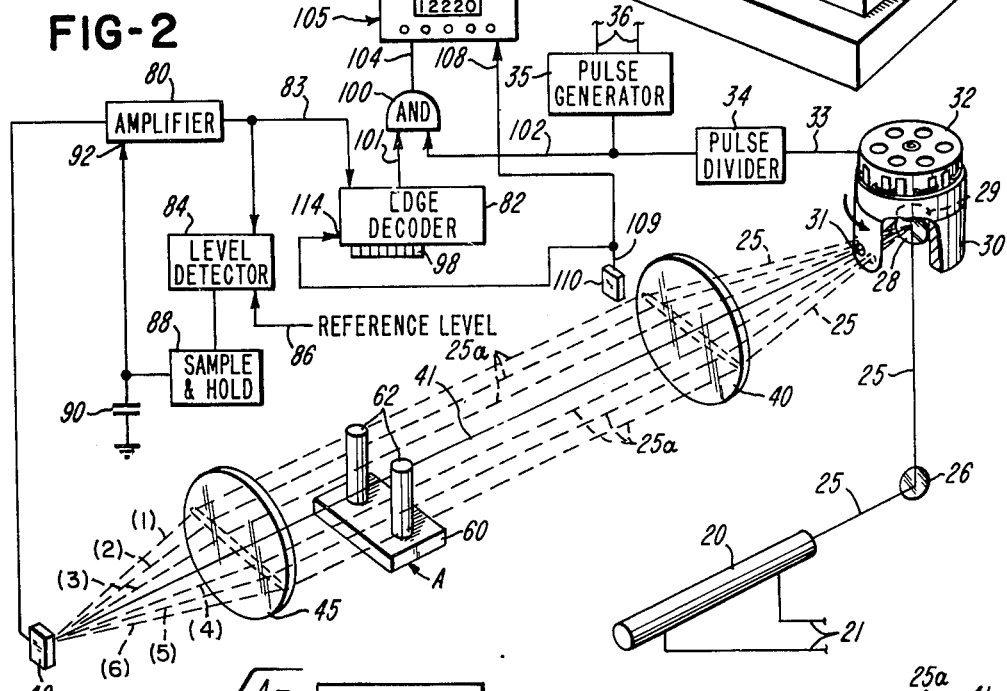
FIG. 2 is a schematic perspective view of the major components of the apparatus shown in FIG. 1, illustrating their general physical arrangement and the electrical circuitry of the apparatus.

The optical measuring apparatus shown in FIGS. 1 and 2 includes an elongate base housing 15 having one end portion supporting a light projector housing 16 and an opposite end portion supporting a light receptor housing 18. An elongate light source in the form of a helium neon laser 20 extends horizontally within the base housing 15 and has conductors 21 adapted to be connected to a suitable power supply. The laser 20 produces a coherent or collimated light beam which is represented by a line 25 and has a diameter of approximately one millimeter.

A circular disc-like first surface mirror 26 is rigidly supported at one end of the base housing 15 and reflects the light beam 25 upwardly into the projector housing 15 and reflects the light beam 25 upwardly into the projector housing 16. Another first surface mirror 28 is positioned in the path of the upwardly projected light beam 25 and is mounted on a stud 29 within the center of an inverted cup-shaped aluminum flywheel 30. The flywheel 30 is shown as being mounted directly on the shaft of a motor 32 which is rigidly supported within the upper portion of the housing 16. The flywheel 30 has a radially extending opening 31 through which the light beam 25 is reflected.

The motor 32 is operated by a 60 hertz power supply transmitted through a conductor 33 extending from a pulse or frequency divider 34 connected to a high frequency pulse generator or clock 35. The clock 35 has conductors 36 for receiving power form a 110 volt AC power supply and produces output pulses at a frequency of six megahertz. The frequency divider 34 divides the high frequency pulses from the clock 35 to the 60 hertz power supply for the motor 32 and incorporates an adjustment for varying the division to provide the operator of the apparatus with means for calibrating the apparatus after it is energized. The rotational axis of the motor 32 and the flywheel 30 is precisely aligned with the upwardly directed light beam 25, and the mirror 28 is positioned precisely at 45° relative to the light beam so when the flywheel 30 and mirror 28 rotate, the light beam 25 is converted into a rotary scanning light beam in a substantially horizontal plane.

A circular scanner lens 40 is positioned with its optical axis 41 in the planar path of the rotary scanning light beam 25 and converts the rotary scanning light beam 25 into a parallel scanning light beam 25 as represented by the parallel lines 25a extending from the lens 40. The motor 32 rotates the mirror 28 at 600 rpm so that the reflected light beam 25 scans the lens 40 at ten times per second. The parallel scanning light beam 25 is adapted to pass through a horizontal slit 42 (FIG. 1) formed within the light receptor housing 18. Another circular lens 45 is positioned with its optical axis the same as the axis 41 and is located adjacent the slit 42 to converge or focus the parallel scanning light beam onto the photosensitive surface of the photocell or photodetector 48 which is also enclosed within the housing 18 and located on the optical axis 41 of the lenses 40 and 45.

Referring to FIG. 1, an article or object positioning device 50 is mounted on the base housing 15 within the gap or space defined between the housing 16 and 18 and includes an upwardly projecting pedestal or frame 52. A rectangular platform or table member 54 is supported for vertical sliding movement on the frame 52. The table member 54 is adjustable vertically by rotation of a crank wheel 56 mounted on the upper end portion of an adjustment screw 57 extending vertically within the frame 52 and threadably engaging the table member 54. The center of the table 54 is located at the focal point of the scanner lens 40 where the diameter of the parallel scanning light beam 25 is minimized at approximately 0.005 inch.

The table member 54 is adapted to support an object or article A which has one or more dimensions to be measured. For purposes of illustration only, the article A includes a base plate 60 which supports two parallel spaced vertical studs or posts 62. The table member 54 has been adjusted until the posts 62 project into the path of the parallel scanning light beam 25. As will be explained later, the measuring apparatus of the invention may be adjusted to measure the diameter of either of the posts 62, or the width of the space between the posts or the overall dimension of the posts. It is to be understood that the measuring apparatus of the invention may be adapted for measuring the dimension of any object whether the object is stationary or moving as, for example, for monitoring of the diameter of a wire being drawn. The term article as used herein, is intended to include any object, part, etc.

Referring to FIG. 2, each pulse or signal received by the photodetector 48 is transmitted to an amplifier 80, and the amplified output signal from the amplifier 80 is transmitted to an edge decoder 82 by a conductor 83. Preferably, a level detector 84 is joined to the output of the amplifier 80 and is provided with a source 86 of a reference level signal which is transmitted to a sample and hold device 88. The sample and hold device 88 is connected to a capacitor 90 and to an amplifier terminal 92, and cooperates with the level detector 84, the level signal source 86 and the capacitor 90 to provide the amplifier 80 with an automatic gain control.

That is, the amplitude of the output of the amplifier 80 is compared with a reference amplitude level produced in the level detector 84. If, for example, the amplitude of the output signal from the amplifier 80 is less than the reference amplitude level, an error signal is transmitted by the level detector 84 through the sample and hold device 88 to the capacitor 90 for charging thereof. The gain of the amplifier 80 is increased until the amplitude of the output signal of the amplifier 80 is equal to the amplitude of the reference level signal. In a like manner, if the amplitude of the output signal of the amplifier 80 is too high, the level detector 84, the sample and hold device 88 and the capacitor 90, cause the amplitude of the output signal of the amplfier 80 to be adjusted to the amplitude of the source 86 of reference level signal. An output signal which is constant in amplitude is thus transmitted by the amplifier 80 to the edge decoder 82 through the conductor 83.

Preferably, the edge decoder 82 is a multiple-bit, parallel-in, serial-out shift register and is provided with a decode mode switch section 98 which is adjustable to establish a desired mode in which the edge decoder provides output signals to an AND gate 100 through a conductor 101. The gate 100 is provided with an input conductor 102 leading from the pulse generator or clock 35. A conductor 104 conducts the output of the gage 100 to a combined display and counter device 105 which has a "read" input terminal 108 connected by a conductor 109 to a photodetector 110 located adjacent the lens 40 in the path of the rotary scanning light beam 25. The display and counter device 105 includes solid state binary elements which count the pulses received from the gate 100 and provides a digital display 112 (FIG. 1) calibrated to correspond to the distance of lateral movement of the parallel scanning light beam 25 during the pulses selected by the switch section 98.

Before the light beam 25 scans article A located on the table member 54, the beam energizes the photodetector 110, and a pulse or signal is transmitted by the conductor 109 to the terminal 108 of the display and counter 105 and also to a terminal 114 of the edge decoder 82. This signal is illustrated by reference (c) in FIG. 3 and is discussed further below.

Figure 3:
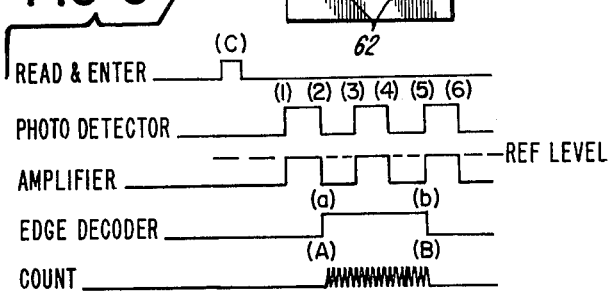
FIG. 3 is a chart illustrating the output pulses or signals produced by some of the electrical components shown in FIG. 2.

The rotary scanning beam 25 then intersects the leading edge of the lens 40 and creates a rise in the amplitude of the signal from the photodetector 48 as indicated by reference (1) in the photodetector output signals shown in FIG. 3. The level of the output signal of the photodetector 48 rmains high uhtil the beam reaches the outer edge of the first post 62 of the article A, as indicated by reference (2) in FIG. 3. The photodetector output signal then remains low until the beam passes the inner edge of the first post 62, as indicated by reference (3) in FIG. 3. The output signal of the photodetector 48 then rises at reference (3) and remains in a high state until the beam intersects the inner edge of the second post 62 as indicated by reference (4). The output signal remains in a low state until the beam passes the outer edge of the second post 62, as indicated by reference (5). The output signal remains high until the beam passes the lens 40, as indicated by the spacing between (5) and (6), and then the signal remains low until the beam again arrives at the leading edge of the lens as indicated by reference (1). FIG. 3 also includes an illustration of the output signal of the amplifier 80 as a result of the signal provided by the photodetector 48 and illustrates that the maximum amplitude of the output of the amplifier 80 is maintained at a constant value equal to the reference level established in the level detector 84, as discussed above.

Any desired mode of output of the edge decoder 82 may be selected by use of the decode mode switch section 98 of the edge decoder 82. If the distance from the outer edge of the first post 62 to the outer edge of the second post 62, i.e., the overall distance of the posts 62, is to be measured, the decode mode switch section 98 of the edge decoder 82 is set so that the output signal of the edge decoder 82 changes to a high state when the signal to the edge decoder 82 from the amplifier 80, becomes high as a result of the intersection of the beam with the outer edge of the first post 62, as indicated by reference (a) in FIG. 3.

The decode mode switch section 98 is set so that the output signal of the edge decoder 82 remains in a high state until the beam passes the outer edge of the second post 62, as indicated by reference (5) in FIG. 3. Thus the signal transmitted to the AND gate 100 through the conductor 101, changes from a low state to a high state as the parallel scanning beam intersects the outer edge of the first post 62 and remains in a high state until the beam passes the outer edge of the second post 62.

The clock 35 is continuously providing pulses of a high frequency through the conductor 102 to and AND gate 100. However, these pulses from the clock 35 pass through and AND gate 100 to the display and counter device 105 only during the period of time that the signal transmitted to the AND gate 100 through the conductor 101 is in the high state. Thus, when the decode mode switch section 98 is set in the manner discussed above, pulses generated in the clock 35 travel through the AND gate 100 to the display and counter device 105 only during the period of time that the parallel scanning light beam 25 is traveling from the outer edge of the first post 62 to the outer edge to the second post 62.

These pulses are illustrated in FIG. 3 between references "A" and "B" and are counted in the display and counter unit 105. Since the pulse divider 34 precisely relates the output signal of the clock 35 to the scan travel of the beam 25, the number of pulses per unit length of linear measurement is constant, even if there should be a long term drift in frequency of the output signal of the clock 35. By properly scaling the pulse divider 34, the display provided by the counter unit 105 may be in units of linear measurement corresponding precisely to the distance between the outer edge of the first post 62, and the outer edge of the second post 62.

As mentioned above, each time the beam 25 intercepts the photodetector 110, a signal is created as represented by (c) in FIG. 3, and is transmitted to the edge decoder 82 through the terminal 114. This signal thus causes the pattern set by the mode switch section 98 to enter the edge decoder 82. The signal from the photodetector 110 also reaches the display and counter device 105 through the terminal 108 and resets the counter portion of the display and counter device 105.

As also stated above, the decode mode switch section 98 of the edge decoder 82 may be adjusted to provide a reading on the display corresponding to the distance between any combination of two of the signals represented by the reference (2) – (5). Furthermore, by the use of a plurality of display and counter devices 105, AND gates 100, and a modified edge decoder 82, a plurality of linear measurements can be provided during each scan of a single parallel scanning light beam. For example, the diameters of both of the posts 62 could be displayed on two devices 105.

It is also to be understood that the display portion of the device 105 need not be used. For example, if the object being measured is a moving continuous member such as a strip or wire or the like which is being produced or formed immediately before measurement by apparatus of the invention, measurements signals may be sensed and counted by apparatus of this invention and be transmitted to means for automatically controlling the dimension of the strip or wire or the like during production or forming thereof.

Figure 4:
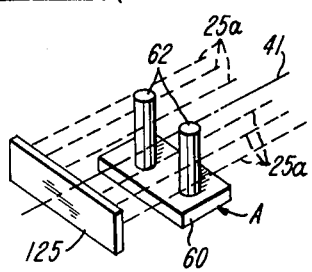
FIG. 4 is a fragmentary perspective view of a modification of the invention.

Referring to FIG. 4 which shows a modification of the measuring apparatus of the invention, the lens 45 and the photodetector 48 as shown in FIG. 2, are replaced by an elongated photocell or photodetector 125 which extends across the path of the parallel scanning light beam 25 normal to the light beam. The photodetector 125 has sufficient length to receive the entire parallel scanning light beam as represented by the lines 25a and is capable of producing all of the signals represented by the references (1) and (6). Preferably, the photodetector 125 is located in the place of the lens 45 and directly in back of the slot 42 within the light receptor housing 18, thereby providing for a reduction in length of the housing 18.

From the drawing and the above description, it is apparent that an optical measuring apparatus constructed in accordance with the invention, provides desirable features and advantages. For example, the rotation of the mirror 28 on an axis precisely aligned with the narrow light beam 25 is effective to produce a rotary scanning light beam within a plane, and with suitable choice of the focal length of the lens 40, the lens 40 effectively converts the rotary scanning light beam into a parallel scanning light beam which travels laterally at a substantially uniform rate. Thus when an article is placed within the path of the parallel scanning light beam, the blackout time of the light beam, which is sensed by the photodetector 48 or 125, corresponds precisely to the dimension of the article represented by the interruptions of the parallel scanning light beam. This structure also provides for economical construction.

Furthermore, the location of the article at the focal point of the lens 40 where the diameter of the light beam 25 is minimized, assures precise actuation of the photodetector 48 or 125. In addition, the edge decoder 82 and the decode mode switch section 98 provide for selectively measuring different dimensions of an article, for example, inside diameters and outside diameters of an annular part, or different dimensions of an assembled part, as discussed above in connection with the article A.

Another important advantage is provided by the adjustable frequency divider 34 which supplies power from the pulse generator or clock 35 to the motor 32. That is, the frequency divider 34 may be conveniently adjusted so that the operator of the apparatus may quickly and conveniently set the precise speed of the motor 32 and thus the lateral travel of the parallel scanning light beam 25 with the pulses produced by the frequency generator or clock 35 after the apparatus is energized. A further advantage is provided by the level detector 84, the sample and hold device 88 and the capacitor 90. These components assure that the output signals from the amplifier 80 remain at a constant reference level as indicated in FIG. 3 so that the apparatus provides for dependable operation.

FIG. 5

FIG. 5 illustrates a modification in a portion of the apparatus of this invention. A coherent or collimated light beam 225 is directed into engagement with a mirror 227, which is rotated about an axis which, preferably, is within, or close to, the plane of the reflectant surface thereof. The light beam 225 may be one which is directed to the mirror 227 directly from a laser such as the laser 20 or the like, or the light beam 225 may be one which is reflected from a mirror, such as the mirror 26 or the like. The mirror 227 is shown as being rotated about a horizontal axis by any suitable motor 230. The mirror 227 may have a very small thickness dimension and may have a reflectant surface on each of the opposed surfaces thereof or on only one surface thereof. The light beam 225 is shown as being vertical and engages the mirror 227 at substantially the axis of rotation thereof.

The light beam 225 engages the rotary mirror 227 and is reflected therefrom, as illustrated by dotted lines 225. During a portion of each revolution, the reflected light beam 225 travels through a lens 240. Thus a parallel scannning light beam travels from the lens 240 toward a lens 245 which has an optical axis substantially coaxial with the optical axis of the lens 240. In its travel from the lens 245, the parallel scanning light beam converges and focuses upon a photodetector 248, which may be similar to the photodetector 48 and functions in a manner slightly to that of the photodetector 48.

A photodetector 310 which is located adjacent the lens 240 may be similar to the photodetector 110 and functions in a manner similar to that of the photodetector 110.

Electrical circuitry, which may be similar to that shown in FIG. 2, is connected to the motor 230 and to the photodetectors 310 and 248 to function in a manner similar thereto, as discussed above.

Thus, the apparatus illustrated in FIG. 5 may function to measure any suitable object, or the spacing between objects and the like. Herein, an object 362 is shown, which extends between the lenses 240 and 245, preferably, at the focal point of the lens 240. The object 362 may be a continuous extrusion, a dimension of which is measured by the apparatus of this invention, or the object 362 may be any other suitable object for measurement by the apparatus of this invention.

As illustrated in FIG. 2, in the apparatus of this invention, a rotary mirror, such as the mirror 28, may be at an angle of 45° to the path of a light beam and may rotate about an axis which is aligned with the light beam. Also, in the apparatus of this invention a rotary mirror, such as the mirror 227, may rotate about an axis which is angular with respect to the light beam.

It is to be understood that, in conjunction with suitable circuitry, the mirror 28 or the mirror 227 may oscillate, rather than rotate, to reflect a light beam within a plane to a lens, such as the lens 40 or the lens 240.

Although the preferred embodiment of the device has been described, it will be understood that within the purview of this invention various changes may be made in the form, details, proportion and arrangement of parts, the combination thereof, and mode of operation, which generally stated consist in a device capable of carrying out the objects set forth, as disclosed and defined in the appended claims.

The invention having thus been described, the following is claimed:

1. In apparatus for optically measuring a dimension relative to an object and including a laser effective to produce a narrow light beam, a reflector member having a reflecting surface positioned within the path of the light beam, means for rotating said reflector member at a constant speed on a fixed axis to produce a rotary scanning light beam within a scanning plane, means for converting the rotary scanning light beam into a planar parallel scanning light beam and having a focal point, means for sensing the parallel scanning light beam and for producing electrical signals in response to interruptions of the light beam by an object positioned within the path of the parallel scanning light beam, means for producing pulses at a constant frequency, means for counting the pulses, and means for controlling said counting means in response to the operation of said sensing means to provide for counting the pulses between predetermined electrical signals, the improvement wherein substantially all of the light from said light beam engages said reflecting surface of said reflector member at substantially a fixed reflecting point, said reflecting point is disposed on the rotational axis of said reflector member causing said rotary scanning light beam to originate from said reflecting point, and said rotary axis of said reflector member extends perpendicular to the plane of said parallel scanning light beam and through the focal point of said means for converting said rotary scanning light beam into a said parallel scanning light beam.

2. Apparatus as defined in claim 1 wherein said means for converting the rotary scanning light beam into a planar parallel scanning light beam comprise a lens having an optical axis, and said rotary axis of said reflector member extends perpendicular to said optical axis.

3. Apparatus as defined in claim 1 wherein said rotary axis of said reflector member extends perpendicular to said narrow light beam engaging said reflecting surface of said reflector member.

4. In a method of optically measuring a dimension relative to an object and including the steps of producing a narrow light beam, positioning a reflector member having a reflecting surface within the path of the light beam, rotating said reflector member at a constant speed on a fixed axis to produce a rotary scanning light beam within a scanning plane, converting the rotary scanning light beam into a planar parallel scanning light beam with means having a focal point, sensing the parallel scanning light beam and producing electrical signals in response to interruptions of the light beam by an object positioned within the path of the parallel scanning light beam, producing pulses at a constant frequency, and counting the pulses between predetermined electrical signals, the improvement comprising the steps of directing substantially all of the light from said light beam at substantially a fixed reflecting point on said reflecting surface of said reflector member, locating said reflecting point on the rotational axis of said reflecting member for causing said rotary scanning light beam to originate from said reflecting point, and positioning said rotary axis of said reflecting member perpendicular to the plane of said parallel scanning light beam and through said focal point of said means converting said rotary scanning light beam into a said parallel scanning light beam.

* * * * *